(12) United States Patent
McClintock et al.

(10) Patent No.: US 9,356,971 B1
(45) Date of Patent: May 31, 2016

(54) BROADCAST-BASED TRUST ESTABLISHMENT

(71) Applicant: Amazon Technologies, Inc., Reno, NV (US)

(72) Inventors: Jon Arron McClintock, Seattle, WA (US); Darren Ernest Canavor, Redmond, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 14/497,146

(22) Filed: Sep. 25, 2014

(51) Int. Cl.
*G06F 7/04* (2006.01)
*H04L 29/06* (2006.01)

(52) U.S. Cl.
CPC ......... *H04L 63/205* (2013.01); *H04L 2463/081* (2013.01)

(58) Field of Classification Search
CPC .................................................. H04L 63/205
USPC ............................................................ 726/4
See application file for complete search history.

(56) References Cited

U.S. PATENT DOCUMENTS 9,210,578 B2 * 12/2015 Ginzboorg ............ H04W 12/10
2005/0033995 A1 * 2/2005 Lin ........................ H04L 9/3234
726/19

* cited by examiner

*Primary Examiner* — Peter Shaw
(74) *Attorney, Agent, or Firm* — Davis Wright Tremaine LLP (57) ABSTRACT

A method and apparatus for device authentication are provided. In the method and apparatus, authentication data for a first device is received. The first device is then authenticated based at least in part on demonstrated access to authentication data prior to broadcast of the authentication data. One or more actions may be taken in response to the authentication of the first device based at least in part on the demonstrated access to the authentication data.

19 Claims, 8 Drawing Sheets

BROADCAST-BASED TRUST ESTABLISHMENT

BACKGROUND

In a client-server communications, among other communication models, trust establishment between communicating parties is important aspect of securely communicating data between the parties. For example, a server may be required to be authenticated by a client device prior to establishing a communication link with the server. Trust establishment may include confirming or verifying that a communicating party has their purported identity. Further, trust establishment may ensure communicated data, which may include sensitive or secretive data, is received by an intended party. Accordingly, spoofing attacks, whereby an attacker may masquerade as a legitimate party to a communication and gain access to the sensitive or secretive data, may be minimized.

Accordingly, it is challenging to establish trust between communicating parties. Further, it is also challenging to establish trust or authenticate a communication party using side-channel broadcast data.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include authenticating a party to a communication based at least in part on demonstrated advanced access to authentication data in advance of broadcast or public dissemination of the authentication data. The authenticated party may be a user device or a server, among others. For example, the user device may be any type of consumer electronics device, such as a smartphone, tablet or computer, and the server may be a webserver or a payment server, among others. Authentication may be performed prior to exchanging secretive or sensitive data, such as an account password or an access token. Further, the authentication may be performed for authorizing a payment or a purchase that are requested by the user device. In addition, the authentication may be performed prior to enforcing a parental control policy that dictates the type of content received by a consumer electronics device.

As described herein, authentication for the purpose of establishing trust between communicating parties may be based at least in part on proving advanced access to authentication data prior to the authentication data becoming accessible publicly, whereby, for example, public access to the authentication data may be performed in a tamper-resistant or tamper-evident manner. A party may demonstrate advanced access to authentication data by providing the authentication to an authenticator before the data is broadcast over a communication channel. The communication channel may be any known transmission of a data stream. The party may be authenticated if the party is able to provide the authentication data ahead of the time at which the data is transmitted over the communication channel. The temporal relationship between receipt of the authentication data from the party sought to be authenticated and receipt of the data over the communication channel may be required to authenticate the party for trust establishment.

A user device may be configured to communicate with a server. For example, a user associated with the device may seek to log on to their account with an online retailer, whereby logging on to the account may be contingent upon providing data including a user name or a password. Prior to sending the data, the server may be authenticated. The server may send authentication data to the user device, whereby the authentication data may be any data sequence. For example, the authentication data may a string of number, letters, symbols or binary data, among others. Further, the authentication data may be images or video.

The server may be authenticated if the received authentication data is determined to correspond to a data portion sent over a communication channel. A correspondence between the authentication data and the data portion is determined to exist if the authentication data and the data portion are identical or the same or if a specified relationship between the authentication data and the data portion is found to exist. For example, the relationship may be a functional relationship, whereby the authentication data may be an outcome of a function of the data portion or vice-versa. The communication channel used to send the data portion may be any type of medium used to convey information unidirectionally or bidirectionally. For example, the communication channel may be a radio or television broadcast. Further, the communication channel may be a blog or social media feed, stream or message. In various embodiments, the communication channel may be a printed publication medium, whereby information may be conveyed via publication in an upcoming issue of a periodical, such as a newspaper, magazine or newsletter.

The server may be authenticated if the authentication data received from the server is found to correspond to a data portion later received over the communication channel. The demonstrated advanced access to the authentication data prior to the data becoming accessible or capable of being publically inspected may be used as the basis for authentication of the server. Once authenticated, the user device may categorize the server as a trusted entity and may send secretive or sensitive data to the server. Conversely, if the authentication data is not found to correspond to data available over the communication channel, the server may be repudiated and the user device may cease communication with the server.

Figure 1:
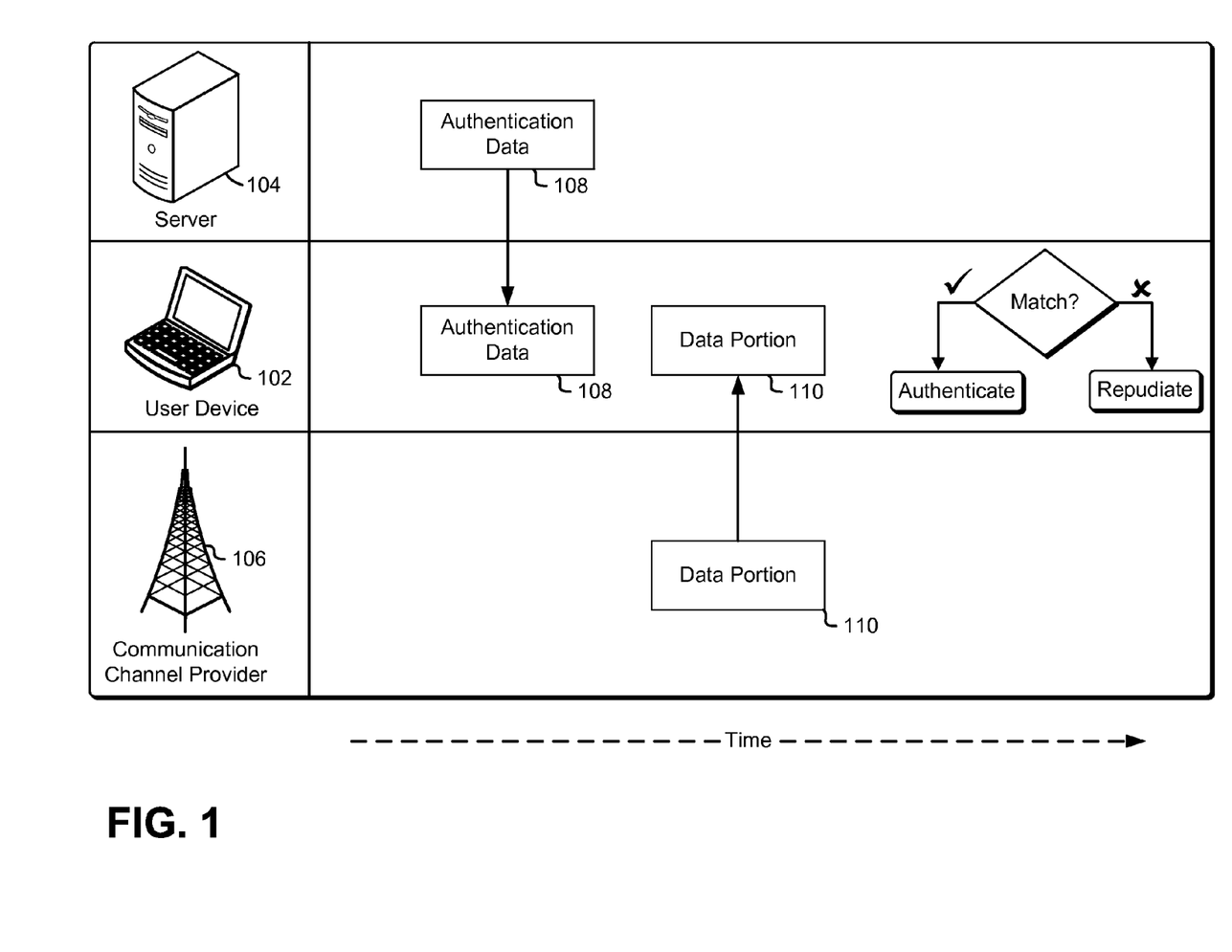
FIG. 1 shows an example of a timing diagram for server authentication in accordance with at least one embodiment.

FIG. 1 shows an example of a timing diagram for server authentication in accordance with at least one embodiment. A user device 102, server 104 and a communication channel provider 106 are shown in FIG. 1. The user device 102, which may be computer or a smartphone, among others, may attempt to authenticate the server 104 to establish trust with the server 104. The authentication may be performed prior to sending sensitive data to the server 104. The user device 102 receives authentication data 108 from the server 104. The authentication data 108 may be a sequence of letters, numerals or symbols. The user device 102 may authenticate the server 104 based at least in part on the authentication data 108.

The communication channel provider 106, which may be any source that disseminates information, such as a blog or broadcast radio or television, broadcasts a data portion 110. The data portion 110 may, for example, be part of a periodic or aperiodic stream of data provided by the communication channel provider 106. Authentication of the server 104 may be performed by verifying that the server 104 had advanced access to the authentication data 108 prior to its broadcast via the communication channel provider 106. For example, the server 104 may generate the authentication data 108 using any type of data generation techniques and may provide the authentication data 108 to the communication channel provider 106 for inclusion in the data portion 110. Accordingly, advanced access to the authentication data 108 by the server 104 may be due at least in part to the fact that the server 104 generated the authentication data 108.

The user device 102 may evaluate the data portion 110 received from the communication channel provider 106 and determine whether the data portion 110 corresponds to the authentication data 108 and whether the data portion 110 was broadcast via the communication channel provider 106 after receipt of the authentication data 108 from the server 104. If it is determined that (1) the data portion 110 corresponds to the authentication data 108 and (2) the data portion 110 was transmitted via the communication channel provider 106 within a timespan subsequent to receipt of the authentication data 108 from the server 104 then the server 104 may be authenticated. Conversely, if it is determined that either the data portion 110 does not correspond to the authentication data 108 or the data portion 110 was not transmitted within a specified timespan subsequent to receipt of the authentication data 108 from the server 104, then the server 104 may not be authenticated. It is noted that although transmission of the authentication data 108 by the server 104 and reception of the authentication data 108 by the user device 102 are shown to be temporally aligned, propagation delay may result in receipt of the authentication data 108 by the user device 102 after its transmission by the server 104. Similarly, receipt of the data portion 110 by the user device 102 may be later in time than the transmission of the data portion 110 by the communication channel provider 106.

Figure 2:
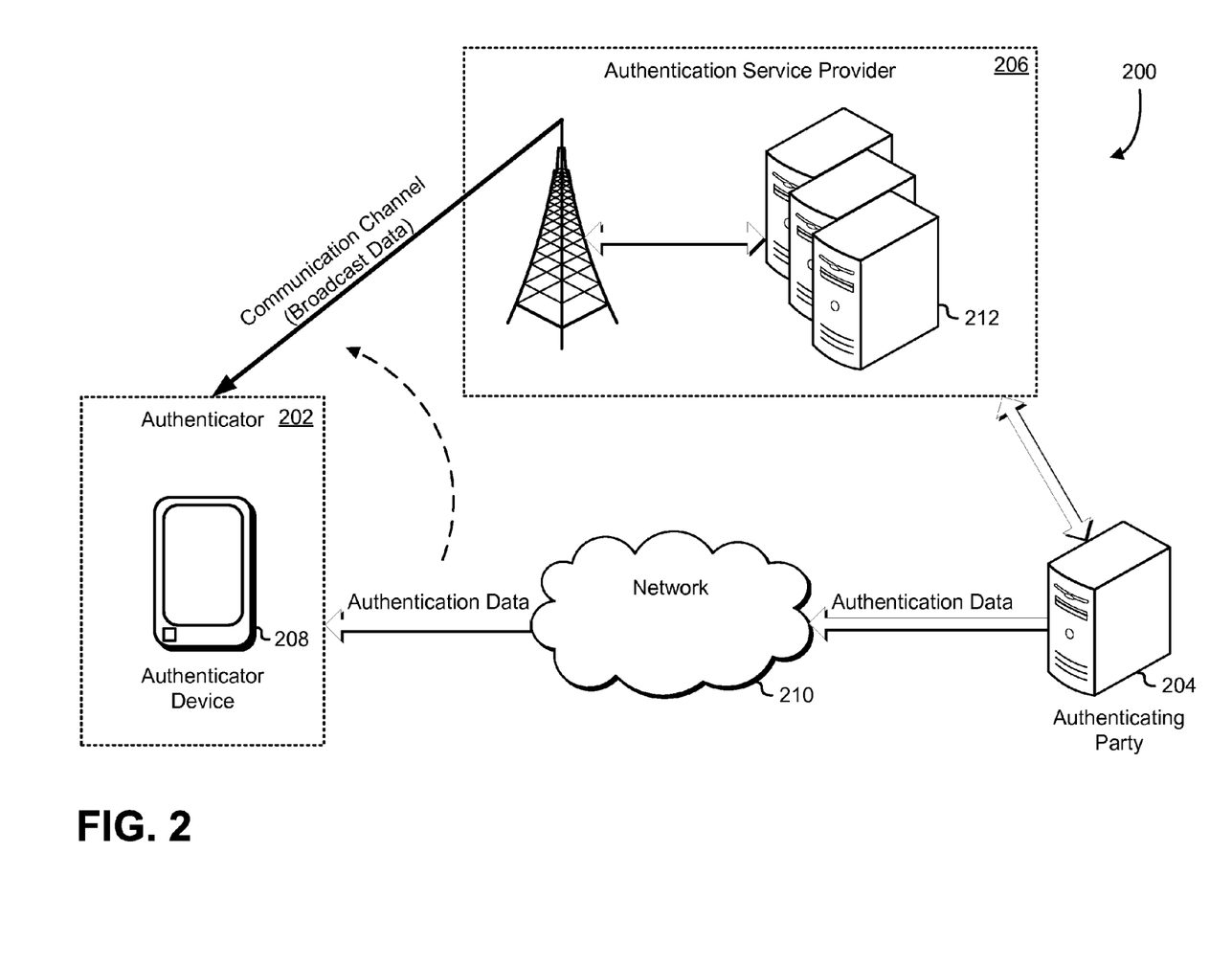
FIG. 2 shows an example of an environment for authentication based at least in part on demonstrated advanced access of broadcast data in accordance with at least one embodiment.

FIG. 2 shows an example of an environment for authentication based at least in part on demonstrated advanced access to broadcast data in accordance with at least one embodiment described herein. The environment 200 includes an authenticator 202, an authenticating party 204 and an authentication service provider 206. The authenticator 202 may be any entity attempting to authenticate the authenticating party 204. For example, the authenticator 202 may be a bank customer that uses the authenticator device 208 to access the authenticating party 204, which may be a webserver purporting, alleging or claiming to be a webserver of the bank or presenting itself to be a webserver of the bank. Further, the authenticator 202 may be a customer of an ecommerce retailer website and the authenticating party 204 may be a webserver accessible by the customer and alleging to be a webserver associated with the ecommerce retailer. The authenticator 202 may seek to authenticate the authenticating party 204 prior to providing sensitive, secretive or critical information to the authenticating party 204. Sensitive, secretive or critical information may be any type of data that may be exploited if known by an attacker. Sensitive, secretive or critical information may include access credentials for an account with a service or payment information, among others. Sensitive, secretive or critical information may also include personal identifiable information (PII) such as name, contact information, biometrics information or identity card numbers, among other. The customer as an authenticator 202 may seek to authenticate the webserver presenting the ecommerce website before submitting or providing their access credentials, such as password or token information.

As shown in the environment 200, the authenticator 202 is associated with an authenticator device 208, which may be any type of device capable of communicating with the authenticating party 204 over a network 210. The authenticator device 208 may, for example, be a smartphone, a personal computer or a tablet. Further, the authenticator device 208 may be a set-top box, a wearable device like a smartwatches or smartglasses, a home automation device or a network-attached storage device. The authenticator device 208 may run an application that enables the authenticator device 208 to communicate with the authenticating party 204. For example, the authenticator device 208 may execute a web browser that enables the authenticator device 208 to access a website of the authenticating party 204. Alternatively, the authenticator device 208 may be equipped with a dedicated application for accessing the authenticating party 204. For example, if the authenticator device 208 is a smartphone or another mobile device, the authenticator device 208 may run a mobile banking application that enables a customer log on to their account with a bank and view their account balances or initiate transactions. Furthermore, the application may be a mobile ecommerce application that enables a customer to browse products or purchase and electronically pay for the purchased products.

As described herein, when transacting or communicating over the network 210, it is important for the authenticator 202 or associated devices to verify that the party to their communication is a trusted party. Ecommerce, banking and other websites or user-facing portals may sometimes be targeted in spoofing attacks, whereby a customer may be deceived into providing sensitive or secretive information (such as account log in information) before confirming the authenticity of the receiving party. Attackers may use spoofing techniques to gain access to customer account and exploit the access for their benefit.

Authenticating a communication party may be based at least in part on advanced access to a portion or a sequence of data in advance of the broadcast of the data. An entity, such as the authenticating party 204, may be authenticated if the authenticating party 204 is able to provide data ahead of publication or broadcast of the data. The data may, in various embodiments, be numbers, letters, characters, colors, images, video, sounds or music, among others. Further, broadcast of the data may include publication or public dissemination of the data.

Broadcasting the data may also include making the data available on a communication channel that is publicly or widely known, whereby the communication channel may be a unidirectional communication channel or a bidirectional communication channel. Further, broadcasting the data may also include making the data available on a communication channel that is asynchronous, tamper-resistant or tamper-evident, among others. For example, broadcasting the data may include transmitting the data over a radio channel or television channel, publishing the data in a newspaper, magazine or blog or making the data available on a social networking account or feed or as a voice greeting message for a phone number. Broadcasting the data may also include making the data available in an unsolicited manner, whereby the data may not be sent to a specific person or entity or in response to any activity. For example, a request for the data may not be required to be received or provided for the data to be sent. Further, an entity or party receiving the data, such as a device, may not be required to be enrolled or registered with a service for the data to be provided. A one-to-many transmission technique may be used for providing the data or the data may be sent to a multicast group or over a large network. In various embodiments, broadcasting the data may include sending the data over a network, whereby receipt of the data may be conditional upon registration with an entity. For example, a listening key may be provided to enable devices to receive the data.

Before use of the authenticator device 208 in sending critical or secretive data to the authenticating party 204, the authenticating party 204 may be sought to be authenticated. The authentication may include receiving authentication data from the authenticating party 204 over the network 210 in advance of broadcast of the authentication data. Further, the authentication may include determining whether the received authentication data corresponds to or is part of broadcast data. If a positive determination is made and the received data portion corresponds (for example, matches) later received broadcast data, then the fact that the authenticating party had prior knowledge of the broadcast may be used to authenticate the party and deem the authenticating party 204 to be a trusted party. Conversely, if the received data portion is determined not to correspond to later received broadcast data, then the authenticating party 204 may not be authenticated or trusted with secretive or sensitive data. Further, the authenticating party 204 may be repudiated. Repudiating the authenticating party 204 may include denying trust establishment with the authenticating party 204 or categorizing or labeling authenticating party 204 as potentially malicious. Further, one or more actions may be performed based at least in part on repudiating the authenticating party 204 including ceasing communication with the authenticating party 204.

A customer may utilize the authenticator device 208 to log on to their account with a service. For example, the customer may provide their user name to the authenticating party 204. Prior to providing their passcode or access token, authentication may be performed. The customer may receive from the authenticating party 204 authentication data as described herein. Further, the customer may receive an identity associated with a communication channel used to provide broadcast data usable for authenticating, based at least in part on the broadcast data, the authenticating party 204. For example, the customer may receive an instruction to tune-in to a known radio or television station or access a known blog or feed, whereby the data portion will be broadcast. Furthermore, the communication channel may be publicly known, whereby a bank or retailer may be associated with a communication channel used authenticating their servers.

The authentication data may be broadcast following receipt of the authentication data, whereby prior access to the authentication data may be used as a basis for authentication. Further, any type of relationship may exist between the received data portion and the broadcast data, whereby the received data portion may be a function of the broadcast data or vice-versa or a correspondence may exist between the received data portion and the broadcast data.

It is advantageous to impose rate limiting identification before vending the authentication data as that would reduce the likelihood of an attacker exposing the authentication data. For example, it may be advantageous to require that the customer provide their user name before receiving the authentication data. Such requirement would reduce the likelihood of an attacker exposing the authentication data by making repeated authentication attempts in order to receive authentication data that is intended to be broadcast and using the authentication data in more sophisticated spoofing attacks.

An authentication service provider 206 is shown in the environment 200. The authentication service provider 206 may include one or more computing resources 212, such as servers, databases or routers, among others, that are configured to provide broadcast or communication channel-based authentication to one or more authenticating parties, such as the authenticating party 204. The authentication service provider 206 may be configured to generate the broadcast data (for example, using a pseudo random number generator or any other type of data generation technique). Further, the authentication service provider 206 may be configured to disseminate a portion of or all of the generated data to the authenticating party 204 for use in providing to the authenticator device 208. In addition, the authentication service provider 206 may also be configured to utilize a communication channel to make the generated data or a portion thereof available to the authenticator 202. For example, the authentication service provider 206 may publish the data using a blog or feed with appropriate timestamps or broadcast the data using a local radio station.

In high latency transactions, the authentication data may be published in an upcoming issued of a printed publication, such as a newspaper, magazine or newsletter. When the generated data or the portion thereof is made available to the authenticator 202, it may be used in determining whether to trust the authenticating party 204 as described herein. The data provided by authentication service provider 206 over the broadcast channel may be compared with earlier received data portion for party authentication. It is noted that although the authenticating party 204 and the authentication service provider 206 are shown in FIG. 2 as being two independent entities, in various embodiments a single party (such as a commercial banking entity or an ecommerce retailer) may perform functionality associated with both entities.

Although one authenticating party is shown in FIG. 2, it may be contemplated that the authentication service provider 206 may provide authentication service to a plurality of authenticating parties. The authentication service provider 206 may segment data provided over the communication channel per authenticating party. Accordingly, an authenticator 202 may use the segmentation to identify pertinent published data based at least in part on the identity of the authenticating party.

Figure 3:
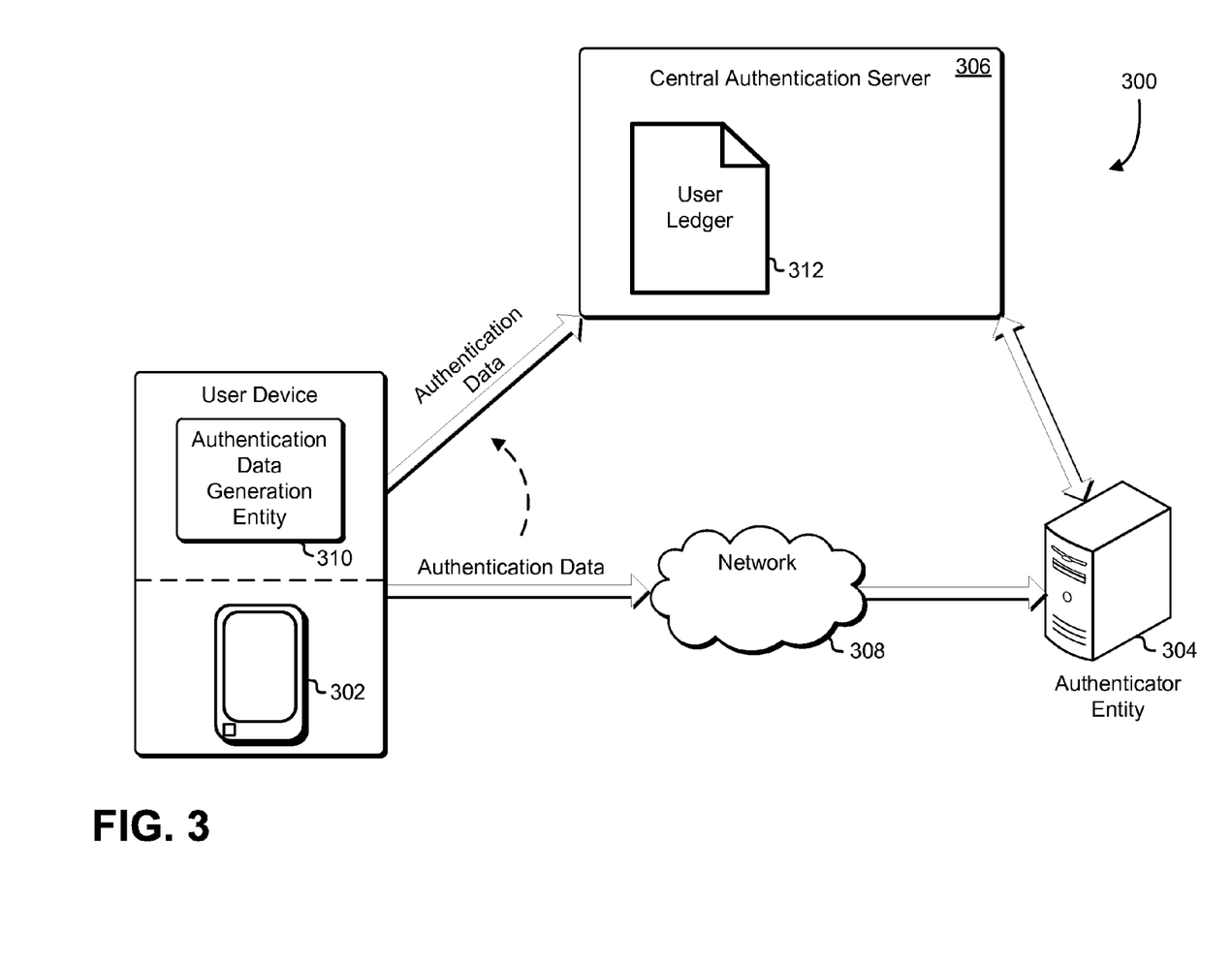
FIG. 3 shows an example of an environment for authentication based at least in part on demonstrated prior access of authentication data in accordance with at least one embodiment.

FIG. 3 shows an example of an environment for authentication based at least in part on demonstrated advanced access to authentication data in accordance with at least one embodiment. In the environment, a user device 302, an authenticator entity 304 and a central authentication server 306 are shown. The user device 302 may be any type of computing device, such as a consumer electronics device. The user device 302 may be a smartphone, computer, tablet, set-top box or smart television, among others. The user device 302 may be equipped with computational, memory and networking functionality. For example, the user device 302 may include a processor, random access memory, a storage device as well as network card, among others. The user device 302 may communicate with the authenticator entity 304 over a network 308, which may be a private network or a public network, such as the Internet. Communication with the authenticator entity 304 may be performed over a Secure Sockets Layer (SSL) cryptographic protocol, among others.

The authenticator entity 304 may be a server or host, among others, that is configured to authenticate the user device 302 or associated user based at least in part on authentication data. The authenticator entity 304 may be a web-server, an application or a payment server, among many others. Similar to the user of the authenticator device described with reference to numeral 208 in FIG. 2, the user may utilize the user device 302 to access an account associated with the user or initiate a payment transaction, among others, whereby the authenticator entity 304 may authenticate the user device 302 or its associated user based at least in part on authentication data. Particularly, the authenticator entity 304 may authenticate the user or user device 302 based at least in part on advanced access to the authentication data. Whereas the authenticator device 208 performed the authentication in the environment 200 described with reference to FIG. 2, the authenticator entity 304 may authenticate the user device 302 or its associated user based at least in part on received authentication data. The user device 302 or its associated user may be authenticated prior to granting access to an account or approving a payment, among other actions.

A user may utilize the user device 302 to log on to an account with an online retailer or Internet-based payment system, whereby prior to initiating or completing a transaction, the user may be required to be authenticated. An authentication data generation entity 310 executed on the user device 302 may generate authentication data. The authentication data may be generated in response to a request by the user. For example, an application executed on the user device 302, such as a web browsing application or an online retailer application, may cause the authentication data to be generated in response to detecting that a transaction requiring user or device authentication was initiated. Further, generation of the authentication data for user authentication may require that the user is identified. For example, the user device 302 may be equipped with a password protection feature, fingerprint scanner or retina scanner and identification of the user based at least in part on a password, fingerprint or retina scan may be required prior to the generation of the authentication data. Accordingly, completion of the transaction may necessitate that the user be both identified by the user device 302 and authenticated by the authenticator party 304.

The authentication data may, as described herein, be one or more numbers, symbols, characters, letter or images, among many others. The user device 302 may send the authentication data to the authenticator entity 304, whereby the authenticator entity 304 may retain the authentication data along with an indication of a time of receipt of the authentication data. The user device 302 may then send the authentication data to the central authentication server 306, whereby the authentication data may be sent via a network (not shown) and a Secure Sockets Layer (SSL) cryptographic protocol may be used for sending the authentication data. The central authentication server 306 may include one or more computing resources configured to receive the authentication data and store the authentication data with an indication of a receipt time associated with the authentication data in a user ledger 312. For example, a database or data store of the central authentication server 306 may be used to retain the user ledger 312. The user ledger 312 may be accessible to the authenticator entity 304 for user authentication. Upon receiving the authentication data, the authenticator entity 304 may access the user ledger 312 by, for example, requesting and receiving recently provided authentication data. Further, the authenticator entity 304 may receive an indication of the time that the authentication data was provided to the central authentication server 306.

To authenticate the user, the authenticator entity 304 may determine whether the authentication data was received from the user device 302 in advance of being provided to the central authentication server 306 or becoming part of the user ledger 312. Conversely, the user may be repudiated if the received authentication data does not match or correspond to later published data that is part of the user ledger 312. Data that is part of the user ledger 312 may be accessible by more than one authenticator entity for the purposes of the user or associated user device 302. For example, various services utilized by the user have access to the user ledger 312 in order to authenticate the user based at least in part on received authentication data. The access to the central authentication server 306 may be fee-based, whereby various operators and vendors may access the user ledger 312 for user authentication in exchange for a fee. Further, the authentication service provider described with reference to numeral 206 in FIG. 2 may implement the central authentication server 306 and associated user ledgers.

Authentication data may be used in various steps of performing payment transactions, including credit card transactions. Receipt of the authentication data from the user device 302 may trigger checking whether funds are available to complete the transaction, whereas confirming that the received authentication data was in fact published in the user ledger 312 may trigger settling the transaction. For example, before checking whether funds are available in a user's account for initiating a payment transaction, a merchant may require that authentication data is received from the user. If the funds are confirmed to be available, the user ledger 312 may be consulted to confirm publication of the authentication data, whereby upon confirmation of the publication, the payment may be settled or the funds may be transferred from the user's payment account to the merchant's account.

When communicating with the authenticator entity 304 or the central authentication server 306, the user device 302 may be identified by a hardcoded credentials. The hardcoded credentials may be assigned to the user device 302 by a manufacturer or by software setup or installation. Further, an attached device (such as a universal serial bus (USB) dongle) may be used to identify the user device 302. When the user device 302 is a smartphone or tablet, a subscriber identification module (SIM) based international mobile subscriber identity (IMSI) or a phone number may be used to identify the user device 302.

Figure 4:
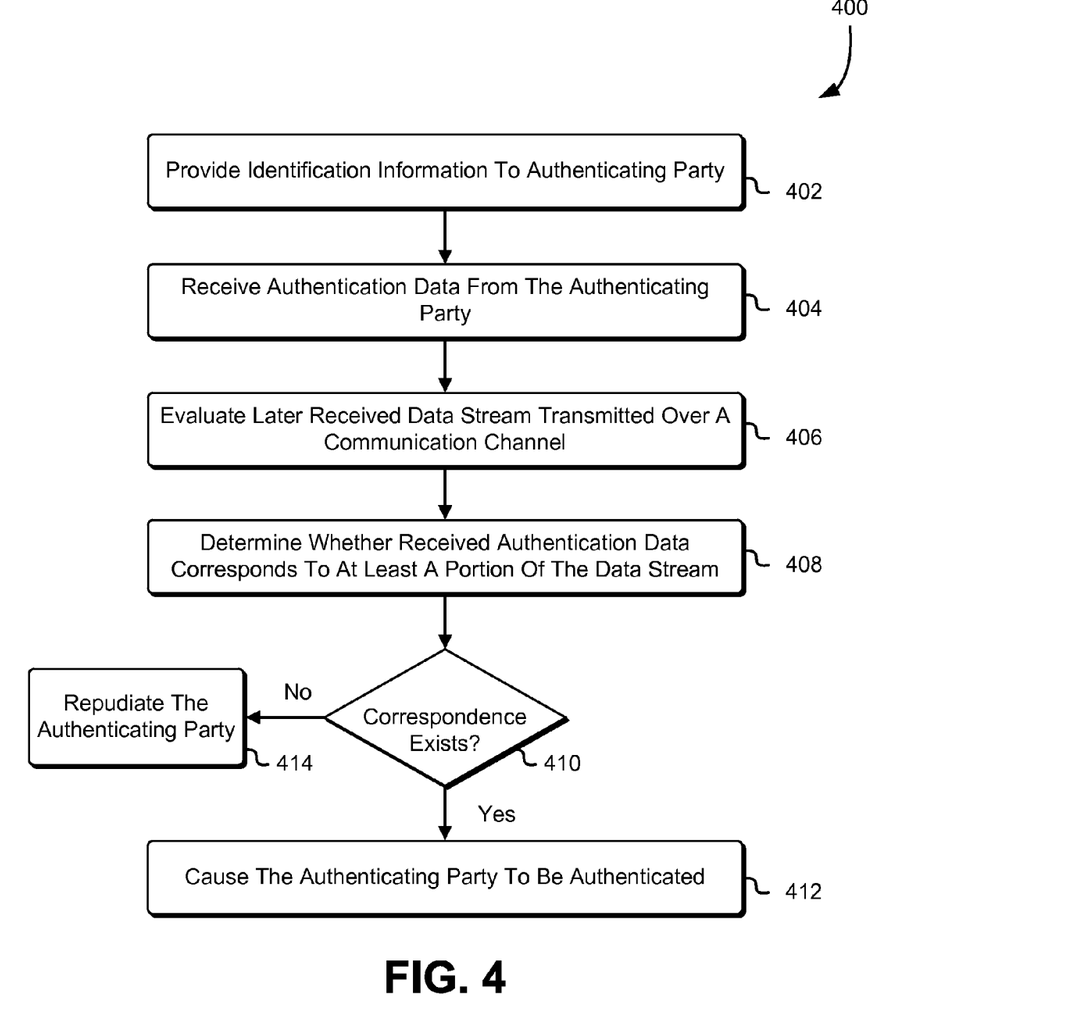
FIG. 4 shows an example of a method for party authentication using advanced access to authentication data in accordance with at least one embodiment.

FIG. 4 shows an example of a method for party authentication using advanced access to authentication data in accordance with at least one embodiment. In the process 400, a user device, such as the authenticator device 208 described with reference to FIG. 2, provides 402 identification information to an authenticating party. The identification information may, for example, be a part of the log in information used to access a website, among others. In response to providing the authentication information, the user device, receives 404 authentication information from the authenticating party. The authentication information may be usable to confirm that the authenticating party is a trusted party. Receiving the authentication information may be conditional upon the identification information being provided. The requirement may be imposed to as a rate-limiting measure and to minimize the likelihood of exposing the authentication information to an attacker, whereby the authentication information may be used for spoofing. It is noted that in various embodiments providing the identification information to an authenticating party may not be required to be performed (for example, in order to receive authentication information from the authenticating party).

The user device or an associated entity then evaluates 406 a later received data stream transmitted over a communication channel. For example, a temporal relationship or time lag may exist between the received authentication data and the data stream. The user device then determines 408 whether the received authentication data corresponds to at least a portion of the data stream. For example, the received authentication data may correspond to at least a portion of the data stream if the received authentication data matches the portion of the data stream or if a specified relationship or mapping between the received authentication data and the portion of the data stream is determined to exist or to be true. In some embodiments, the authentication data corresponds to the portion of the data stream if they are equal. However, in other embodiments, the authentication data corresponds to the portion of the data stream even though the authentication data and the portion of the data stream are not equal. For example, the authentication data may match the portion of the data stream if the authentication data is contained in the portion of the data stream. As another example, the authentication data may match the portion of the data stream if the application or a hash function or another function to the authentication data produces the portion of the data stream or vice-versa. Furthermore, the authentication information may be associated with a validity period. The validity period may specify an interval of time during which a later received data stream corresponds to the authentication information. The authentication information may not be used for authenticating a party if the corresponding portion of the data stream is broadcast outside of the validity period by, for example, being transmitted sooner or later than expected. In various embodiments, the authentication information may include an indication of the time when the authentication information was generated or when the corresponding data portion of the data stream is to be transmitted. The validity period may be a function of the propagation delay inherent in the utilized broadcast medium. In addition, validity period may deter against spoofing attacks by imposing a minimum delay time between receipt of the authentication data and broadcast of corresponding broadcast data.

If a correspondence between the received authentication data and the portion of the data stream is determined 410 to exist, the user device causes 412 the authenticating party to be authenticated. Once authenticated, the user device may provide sensitive or secretive data to the authenticating party, such as a password or token. Conversely, if a correspondence between the received authentication data and the portion of the data stream is determined 410 not to exist, the user device repudiates 412 the authenticating party. One or more actions may be performed based at least in part on the repudiation include ceasing communication with the party.

Figure 5:
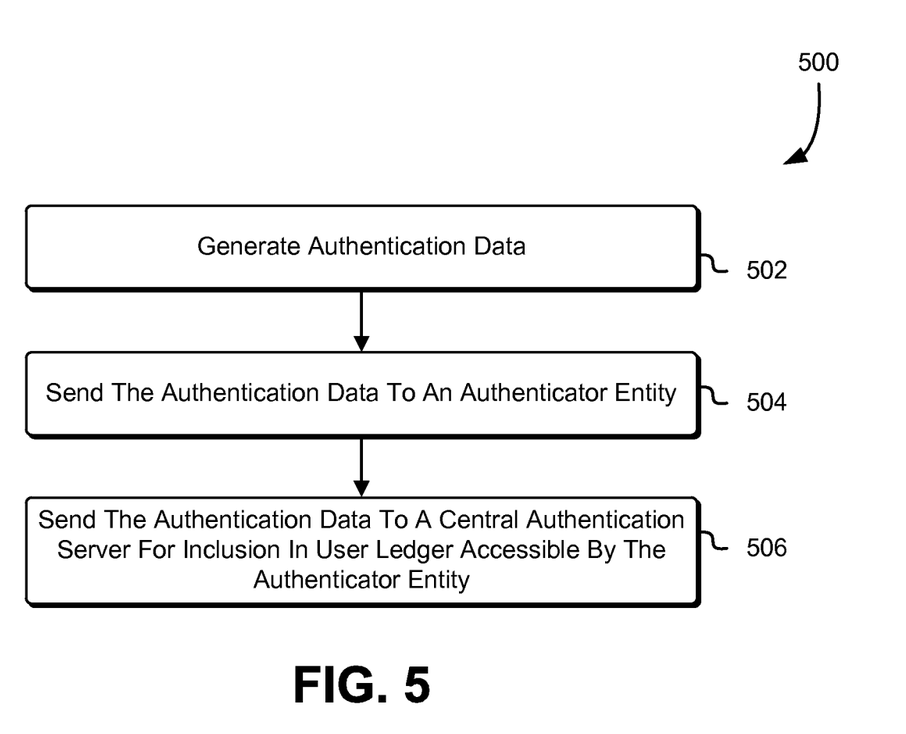
FIG. 5 shows an example of a method for user or device authentication in accordance with at least one embodiment.

FIG. 5 shows an example of a method for user or device authentication in accordance with at least one embodiment. In the process 500, a user device, such as the user device 302 described with reference to FIG. 3, generates 502 authentication data. The authentication data may be generated by a pseudo random number generator of the user device. Further, the authentication data may be generated in response to a request to authenticate the user device or a user of the user device. In a mobile wallet application, the user device may be used to pay for the purchase of an item at a store payment terminal, whereby, for example a barcode of the user device may be scanned or the user device may be otherwise identified. Initiating payment may be a trigger for generating the authentication. The user device then sends 504 the authentication data to an authenticator entity, whereby, as described herein, the authenticator entity may be an authenticator server or payment server, among others.

The user device also sends 506 the authentication data to a central authentication server for inclusion in user ledger accessible by the authenticator entity. The authentication data may be kept in the user ledger with an associated timestamp, whereby the timestamp may be indication of transmission or receipt of the authentication data. The authentication data may be stored in the user ledger with the associated timestamp for user authentication. For example, user authentication may be performed based at least in part on demonstrated advanced access to the authentication data prior to incorporation of the authentication data in the user ledger.

Figure 6:
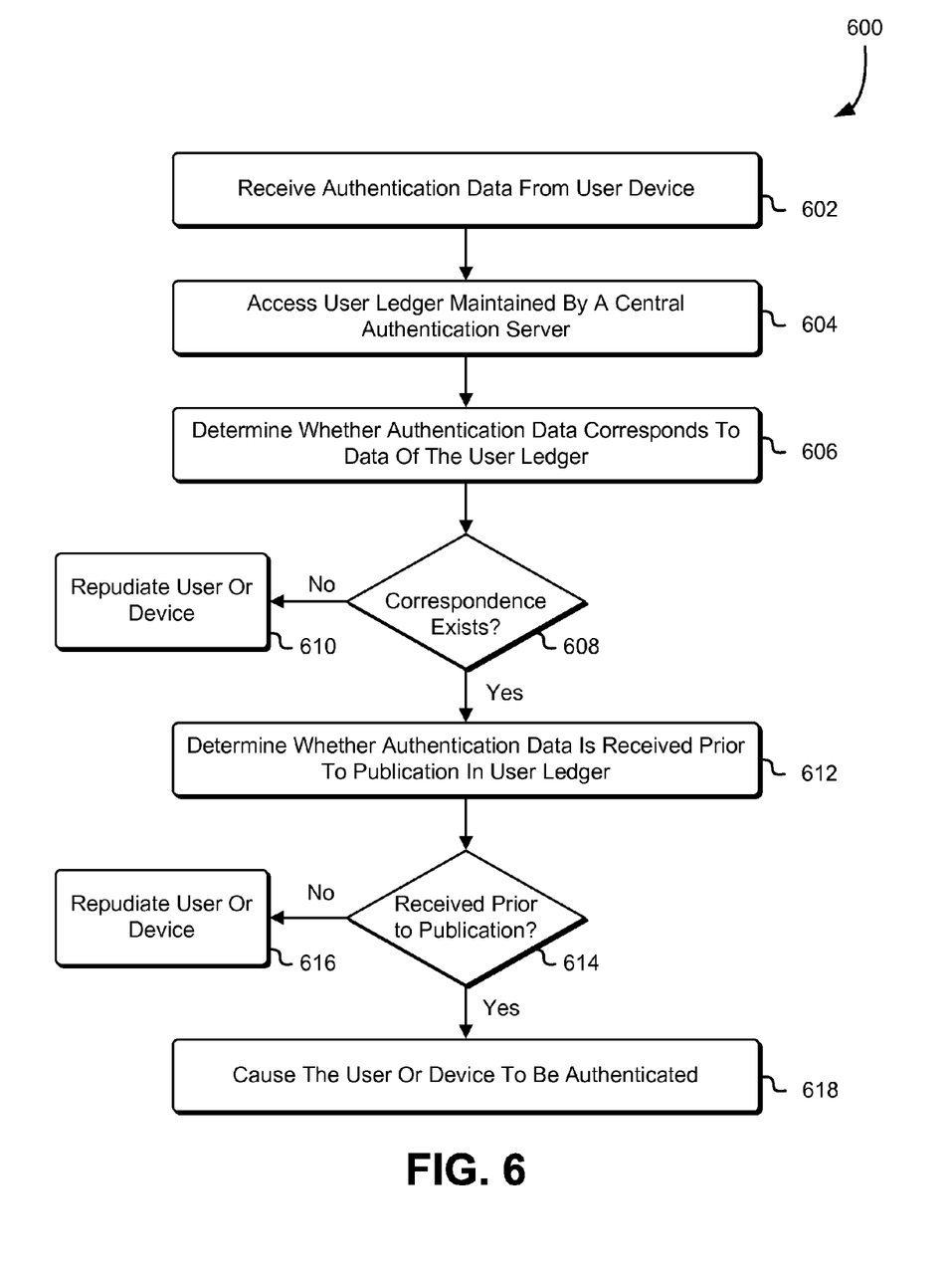
FIG. 6 shows an example of a method for user or device authentication in accordance with at least one embodiment.

FIG. 6 shows an example of a method for user or device authentication in accordance with at least one embodiment. In the process 600, a server, which may be the authenticator entity 304 described with reference to FIG. 3, receives 602 authentication data from a user device. The authentication data may be any type of data, such as numerals, letters or symbols, among others. The authentication data may be provided to the server in order to authenticate the user device or a user utilizing the user device. Upon receiving the authentication data, the server accesses 604 a user ledger maintained by a central authentication server, whereby the user ledger may be stored in a database that is accessible by the server. The server determines 606 whether the authentication data corresponds to data of the user ledger, whereby a correspondence is determined to exist if the authentication data matches data that is part of the user ledger.

If it is determined 608 that a correspondence does not exist, the server repudiates 610 the user or device that is sought to be authenticated. Conversely, if it is determined 608 that a correspondence does exist, the server then determines 612 whether the authentication data is received by the server prior to publication in the user ledger. The temporal relationship between receipt of the authentication data and publication in the user ledger may be a basis for user or device authentication. If it is determined 614 that the authentication data is not received by the server prior to publication in the user ledger, the server repudiates 616 the user or the device due at least in part to the fact that prior access to the authentication data has not been demonstrated. Conversely, if it is determined 614 that the authentication data is received by the server prior to publication in the user ledger, the server causes the user or device to be authenticated. One or more actions may be taken based at least in part on the authentication including settling a payment transaction or permitting access to an account. It is noted that more than one device may be used for authentication. For example, a first device may receive the authentication data, where as a second device that is different from the first device may be used to check a user ledger or a data broadcast for determining whether the authentication data matches the data that is broadcast or provided by the ledger.

In various embodiments, location-based authentication may be used in conjunction with the techniques described herein. For example, a public communication channel used to provide broadcast data for authentication may be confined to limited to a geographic area. Confining the broadcast to a geographic area may be performed by broadcasting over a local radio station (for example, that is broadcasting at a relatively small wattage) or using a wireless local area network (WLAN) such as a municipal wireless network. Location-based authentication may enable an additional layer of authentication. For example, a payment provider may utilize location-based authentication to verify that an account holder is making a purchase in close proximity to their home address and to detect fraudulent activity. The authentication techniques described herein may be used for enforcing a parental control policy. If two devices have a parent-child relationship, authentication data generates by the parent device and published to a user or device ledger may be communicated to the child device for use in accessing content. Content may be provided by a server to the child device upon confirming that the authentication data is published in a ledger of the parent device.

It is noted that in various embodiments a plurality of broadcast channels may be used to transmit authentication data. For example, to authenticate an entity, the authenticator may be required to evaluate a plurality of broadcast channels and determine whether the received data corresponds to data broadcast over the plurality of broadcast channels. A first portion of the data may be broadcast over a first channel whereas a second portion of the data may be broadcast over a second channel and the authenticator may be configured to evaluate both to authenticate an authenticating party.

Figure 7:
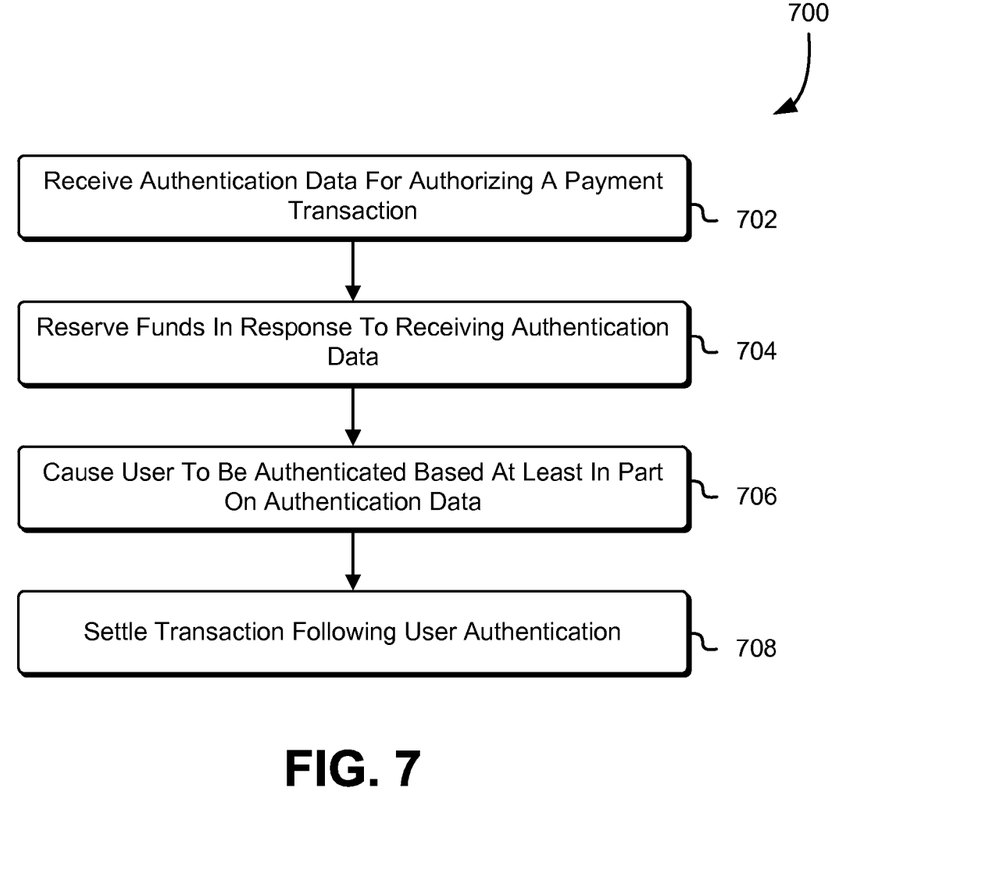
FIG. 7 shows an example of a method for using authentication data to authorize a payment transaction.

FIG. 7 shows an example of a method for using authentication data to authorize a payment transaction. In the process 700, a server, such as a payment server receives 702 authentication data for authorizing a payment transaction. The authentication data may be a sequence of symbols as described herein. Further, the authentication data may be generated by and received from a user device, such as a smartphone, used for authorizing a payment from a credit card or another type of monetary account. In response to receiving the authentication data, the payment server reserves 704 funds from the payment account. However, settlement of payment or transfer of funds to the payee may only be performed following authentication of a payer based at least in part on the authentication data.

The server then causes 706 the user to be authenticated based at least in part on authentication data. For example, the server may evaluate a ledger of the user authorizing the payment to determine whether the received authentication data corresponds to data of the ledger. Authenticating the user includes determining that the authentication data was published in the ledger following receipt of the authentication data by the server. The server settles 708 the transaction following authentication of the user based at least in part on the authentication data. Settlement of the transaction may include transferring requested funds from the user's account to a third party account.

Figure 8:
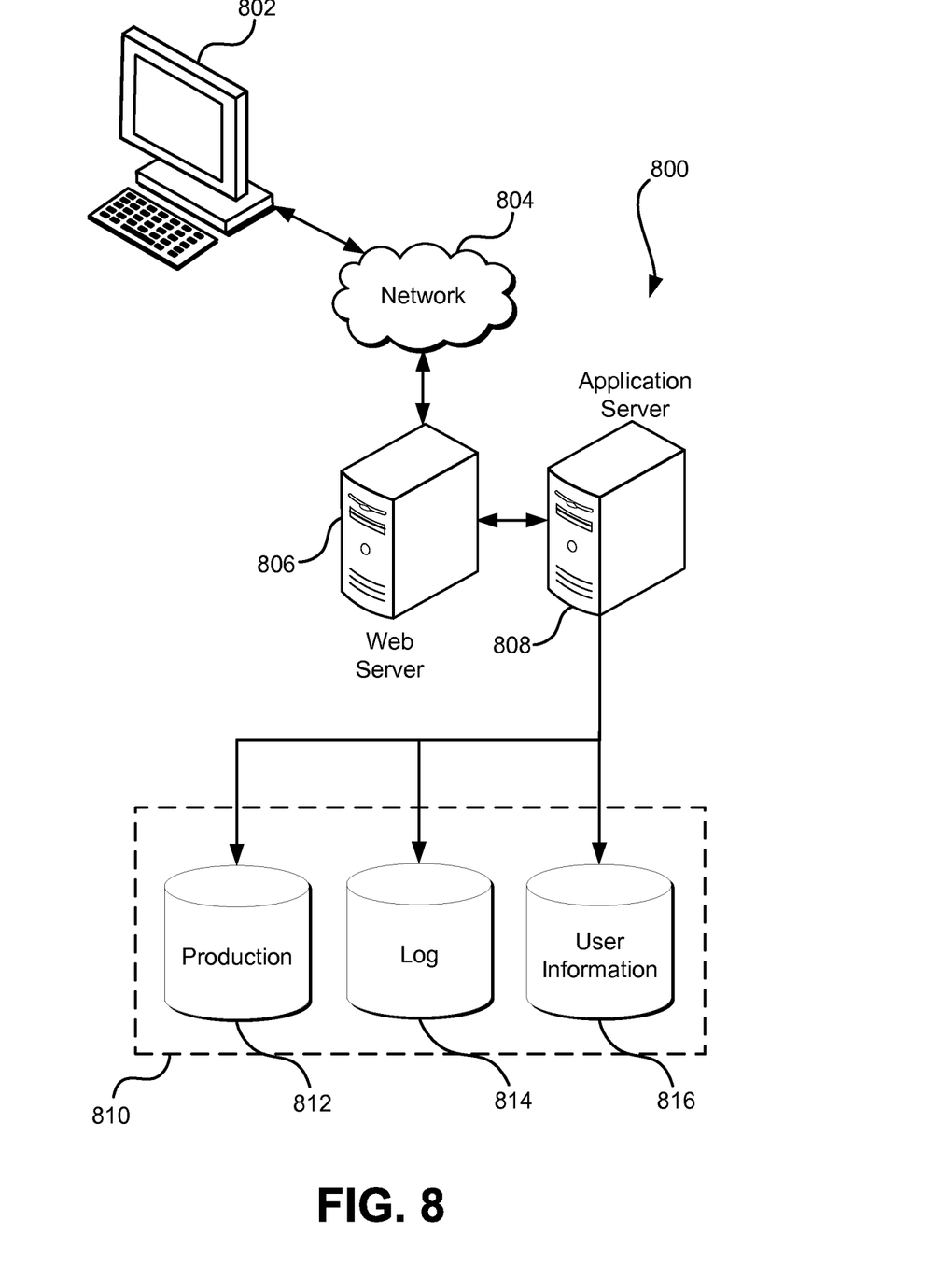
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for authentication, comprising:
   under the control of one or more computer systems with one or more processors that execute executable instructions,
      receiving, from a server, authentication data, the authentication data comprising a sequence of data and being usable to authenticate the server;
      receiving an identity associated with a public communications channel;
      identifying a data portion transmitted over the public communication channel, the data portion being a portion of a stream of data transmitted over the public communication channel, wherein the data portion is broadcast over television, radio, print media, social media feed, or blog;
      determining that the authentication data matches the data portion;
      determining that the authentication data is received prior to transmission of the data portion; and
      authenticating the server due at least in part to determining that the authentication data matches the data portion and the authentication data is received prior to publication of the data portion.

2. The computer-implemented method of claim 1, further comprising repudiating the server on a condition that advanced access to publically broadcast data is not demonstrated.

3. The computer-implemented method of claim 1, wherein the identity associated with the public communication channel is received together with the authentication data.

4. The computer-implemented method of claim 1, wherein:
   the method further comprises sending, to the server, identification information associated with an authenticator, the authenticator being an entity configured to authenticate the server;
   the authentication data is received in response to sending the identification information; and
   the identification information includes at least a portion of access credentials of the authenticator.

5. A system, comprising at least one computing device configured to implement one or more services, wherein the one or more services:
   receive, from a server, authentication data, the authentication data comprising a sequence of data and being usable to authenticate the server;
   receive an identity associated with a public communications channel;
   identify a data portion transmitted over the public communication channel, the data portion being a portion of a stream of data transmitted over the public communication channel, wherein the data portion is broadcast over television, radio, print media, social media feed, or blog;
   determine that the authentication data matches the data portion;
   determine that the authentication data is received prior to transmission of the data portion; and
   authenticate the server due at least in part to determining that the authentication data matches the data portion and the authentication data is received prior to publication of the data portion.

6. The system of claim 5, wherein the one or more services further:
   identify, based at least in part on the identity, a communication channel used to broadcast the authentication data;
   determine whether the authentication data is broadcast on the communication channel; and
   determine whether the authentication data is received prior to broadcast on the communication channel.

7. The system of claim 6, wherein the one or more services receive the identity associated with the communication channel with the authentication data.

8. The system of claim 5, wherein the system, as a result of successful authentication of the server, sends secretive information to the server authorizing a transaction.

9. The system of claim 5, wherein:
   the one or more services send an identity associated with an authenticator entity to the server; and
   receiving the authentication data is conditional upon sending the identity associated with the authenticator entity.

10. The system of claim 5, wherein the one or more services repudiate the server on a condition that demonstrated access to the authentication data prior to broadcast of the authentication data is not established.

11. The system of claim 5, wherein the authentication data includes at least one of numerals, letters, symbols, images or video.

12. A non-transitory computer-readable storage medium having stored thereon executable instructions that, as a result of execution by one or more processors of a computer system, cause the computer system to at least:
   receive, from a server, authentication data, the authentication data comprising a sequence of data and being usable to authenticate the server;
   receive an identity associated with a public communications channel;
   identify a data portion transmitted over the public communication channel, the data portion being a portion of a stream of data transmitted over the public communication channel, wherein the data portion is broadcast over television, radio, print media, social media feed, or blog;
   determine that the authentication data matches the data portion;
   determine that the authentication data is received prior to transmission of the data portion; and
   authenticate the server due at least in part to determining that the authentication data matches the data portion and the authentication data is received prior to publication of the data portion.

13. The non-transitory computer-readable storage medium of claim 12, wherein the instructions further comprise instructions that, as a result of execution by the one or more processors, cause the computer system to receive an indication of a time of the broadcast of the authentication data.

14. The non-transitory computer-readable storage medium of claim 12, wherein the server is authenticated if the authentication data is determined to be received by the server prior to broadcast of the data portion.

15. The non-transitory computer-readable storage medium of claim 12, wherein the identity specifies a communication channel.

16. The non-transitory computer-readable storage medium of claim 15, wherein the instructions further comprise instructions that, as a result of execution by the one or more processors, cause the computer system to send secretive data in response to authentication based at least in part on the authentication data.

17. The non-transitory computer-readable storage medium of claim 12, wherein a second device, different from the computer system, is used determine that the authentication data corresponds to broadcast data received over a communication channel.

18. The non-transitory computer-readable storage medium of claim 12, wherein the authentication data is broadcast to a multicast group of which the computer system is a member.

19. The non-transitory computer-readable storage medium of claim 12, wherein the authentication data includes at least one of numerals, letters, symbols, images or video.

\* \* \* \* \*